US011700067B2

(12) United States Patent
Yaman et al.

(10) Patent No.: US 11,700,067 B2
(45) Date of Patent: Jul. 11, 2023

(54) THREE-WAY BRANCHING UNIT SWITCH MODULE HAVING SMALL FOOTPRINT

(71) Applicant: NEC Laboratories America, Inc., Princeton, NJ (US)

(72) Inventors: Fatih Yaman, Princeton, NJ (US); Shinsuke Fujisawa, Princeton, NJ (US); Hussam Batshon, Monroe, NJ (US); Yoshinari Takigawa, Tokyo (JP); Ryu Kurahashi, Tokyo (JP); Ryuji Aida, Tokyo (JP); Kohei Nakamura, Tokyo (JP); Takanori Inoue, Tokyo (JP); Eduardo Rodriguez, Tokyo (JP); Yoshihisa Inada, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 17/468,655

(22) Filed: Sep. 7, 2021

(65) Prior Publication Data

US 2022/0085896 A1    Mar. 17, 2022

Related U.S. Application Data

(60) Provisional application No. 63/077,316, filed on Sep. 11, 2020.

(51) Int. Cl.
*H04Q 11/00* (2006.01)
*H04B 10/80* (2013.01)
*G02B 6/44* (2006.01)

(52) U.S. Cl.
CPC .......... *H04B 10/80* (2013.01); *G02B 6/4427* (2013.01); *H04Q 11/0001* (2013.01)

(58) Field of Classification Search
None
See application file for complete search history.

(56) References Cited

U.S. PATENT DOCUMENTS

| | | | | |
|---|---|---|---|---|
| 5,838,477 A | * | 11/1998 | Yamamoto | G02B 6/29383 398/179 |
| 6,377,373 B1 | * | 4/2002 | Kawazawa | H04B 10/27 398/82 |
| 6,895,187 B1 | * | 5/2005 | Webb | H04Q 11/0005 398/104 |
| 7,212,738 B1 | * | 5/2007 | Wang | H04J 14/0246 398/5 |
| 8,798,473 B2 | * | 8/2014 | Inoue | H04B 10/27 398/94 |
| 9,654,209 B2 | * | 5/2017 | Ji | H04B 10/032 |
| 9,654,246 B2 | * | 5/2017 | Ji | H04J 14/0221 |
| 9,712,274 B2 | * | 7/2017 | Thoguluva | H04B 10/278 |
| 9,800,329 B2 | * | 10/2017 | Hibino | H04B 10/0771 |
| 9,810,849 B2 | * | 11/2017 | Pescod | H04J 14/02 |
| 9,882,671 B2 | * | 1/2018 | Nakada | H04J 14/0221 |
| 10,003,425 B2 | * | 6/2018 | Abbott | H04J 14/0206 |

(Continued)

OTHER PUBLICATIONS

N/A "Multidirectional Submarine Optical Branching Unit", Technical Disclosure Commons, Defensive Publications Series, Art. 3362, Jun. 24, 2020 (pp. 2-8; table 1; and figures 1-4.

*Primary Examiner* — Jai M Lee
(74) *Attorney, Agent, or Firm* — Joseph Kolodka

(57) ABSTRACT

Aspects of the present disclosure describe a three-way branching unit switch module having a small footprint suitable for application in an undersea application.

1 Claim, 20 Drawing Sheets

(56) References Cited

U.S. PATENT DOCUMENTS

| | | | |
|---|---|---|---|
| 10,707,957 B2* | 7/2020 | Frisch | H04Q 11/0062 |
| 10,771,179 B1* | 9/2020 | Marcenac | H04B 10/25891 |
| 11,487,063 B2* | 11/2022 | Garrett | H04Q 11/0005 |
| 2002/0057477 A1* | 5/2002 | Rocca | H04J 14/0279 |
| | | | 398/104 |
| 2011/0317997 A1* | 12/2011 | Satou | H04J 14/0289 |
| | | | 398/20 |
| 2016/0315701 A1* | 10/2016 | Yuki | H04J 14/0212 |
| 2021/0302660 A1* | 9/2021 | Garrett | H04J 14/0267 |
| 2021/0302678 A1* | 9/2021 | Garrett | H04J 14/0205 |
| 2022/0182170 A1* | 6/2022 | Yaman | H04Q 11/0001 |
| 2022/0352925 A1* | 11/2022 | Yamaguchi | H04L 12/10 |

* cited by examiner

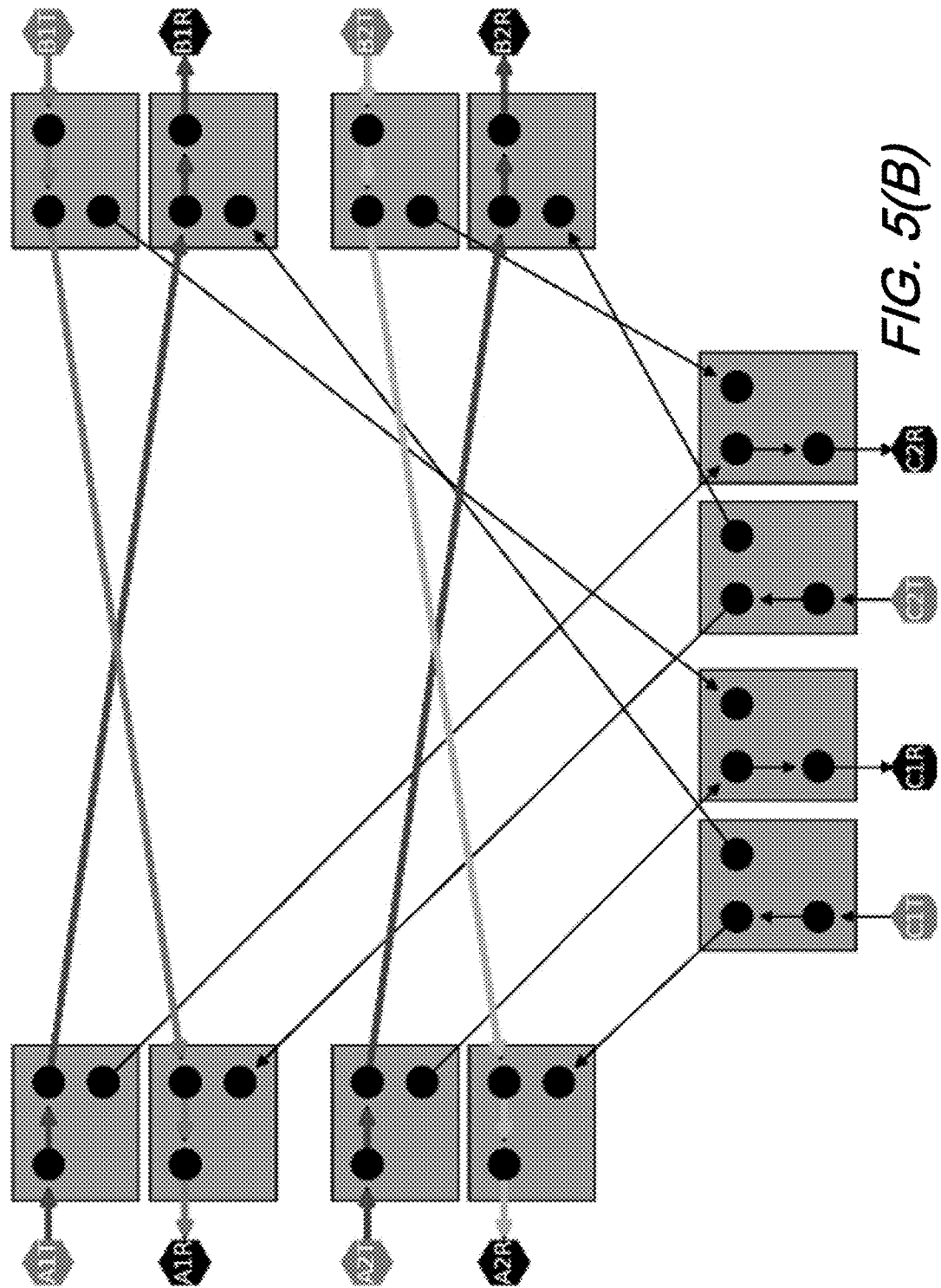

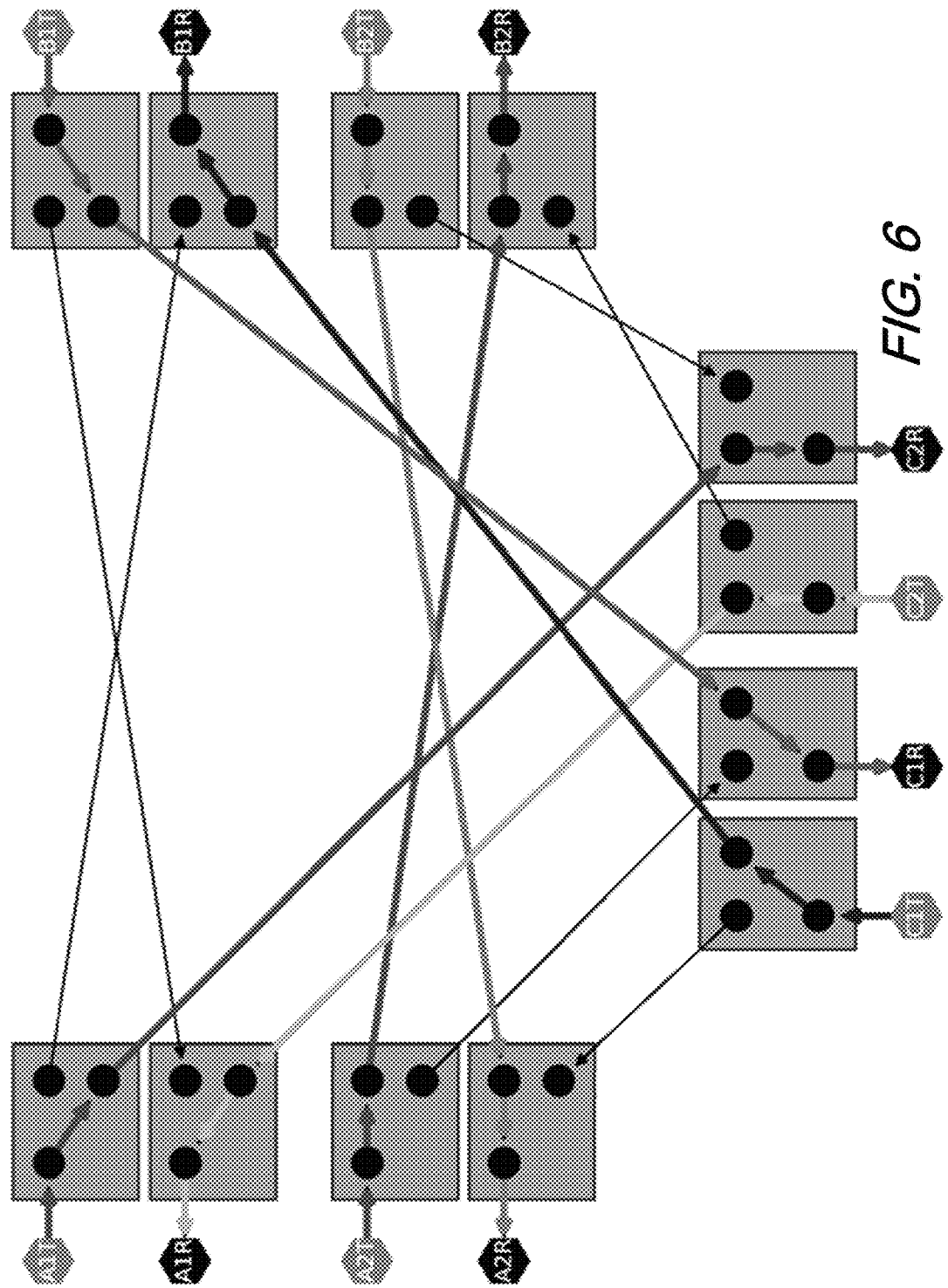

THREE-WAY BRANCHING UNIT SWITCH MODULE HAVING SMALL FOOTPRINT

CROSS REFERENCE

This disclosure claims the benefit of U.S. Provisional Patent Application Ser. No. 63/077,316 filed 11 Sep. 2020, the entire contents of which is incorporated by reference as if set forth at length herein.

TECHNICAL FIELD

This disclosure relates generally to fiber optic telecommunications networks and undersea (under water) fiber optic telecommunications systems. More specifically, it pertains to a 3-way branching unit switch module exhibiting a small footprint.

BACKGROUND

Global networking service providers have necessarily deployed large scale, fiber optic network infrastructures—reaching almost everywhere on Earth—to provide for an ever increasing, insatiable demand for telecommunications bandwidth including the Internet. As is readily understood and appreciated, such fiber optic networks necessarily include submarine/undersea/underwater transmission facilities that in one regard, are the backbone of world-wide telecommunications.

Nearly all the data traffic that travels between continents is delivered via fiber optic cables laid on the seabed floor. There are several facets of a submarine transmission system that differentiates it from other, terrestrial fiber communication systems. First, they are very long, as they typically connect different continents. Second, it is very expensive to deploy undersea cables. Finally, once such undersea cable is laid it is extremely expensive to replace, upgrade, or repair. As a result, even small degradations in transmission capacity are problematic.

To mitigate problems associated with degraded transmission capacity of undersea fiber optic cables, service providers have employed various strategies for providing route diversity such that if a particular route or routes become degraded, other route or routes may be employed such that disruptions to services are minimized.

Consequently, systems, methods and structures that provide for enhanced route diversity in an undersea fiber optic network infrastructure would represent a significant and most welcome addition to the art.

SUMMARY

An advance in the art is made according to aspects of the present disclosure directed to fiber optic telecommunications systems that exhibit improved route diversity thereby providing for more robust, and reliable telecommunications as compared to the prior art.

In sharp contrast to the prior art, systems, methods, and structures according to aspects of the present disclosure employ an inventive 3-way switching function (3WS) to provide such diversity.

BRIEF DESCRIPTION OF THE DRAWING

A more complete understanding of the present disclosure may be realized by reference to the accompanying drawing in which:

FIG. 5(A), FIG. 5(B), FIG. 5(C), and FIG. 5(D) are schematic diagrams of the 1×2 switch of FIG. 4 showing the 4 possible module states for an architecture that uses 12 1×2 switches wherein traffic carrying connections are shown with arrow end points and thinner lines do not carry traffic in which: FIG. 5(A) shows STATE=1; FIG. 5(B) shows STATE=2; FIG. 5(C) shows STATE=3; and FIG. 5(D) shows STATE=4 according to aspects of the present disclosure;

FIG. 6 is a schematic diagram illustrating the 1×2 switch having an alternative setting for STATE=1 according to aspects of the present disclosure;

FIG. 8(A), FIG. 8(B), FIG. 8(C), and FIG. 8(D) are schematic diagrams of an architecture including the six (6) 1×2 switches and 6 circulators of FIG. 7 showing the 4 possible module states for the 1×2 switches wherein traffic carrying connections are shown with arrow end points and thinner lines do not carry traffic in which: FIG. 8(A) shows STATE=1; FIG. 8(B) shows STATE=2; FIG. 8(C) shows STATE=3; and FIG. 8(D) shows STATE=4 according to aspects of the present disclosure;

FIG. 11(A), FIG. 11(B), FIG. 11(C), and FIG. 11(D) are schematic diagrams of an architecture including six (6) 2×2 switches of FIG. 10 showing the 4 possible module states for the 2×2 switches wherein traffic carrying connections are shown with arrow end points and thinner lines do not carry traffic in which: FIG. 11(A) shows STATE=1; FIG. 11(B) shows STATE=2; FIG. 11(C) shows STATE=3; and FIG. 11(D) shows STATE=4 according to aspects of the present disclosure.

DESCRIPTION

Figure 1:
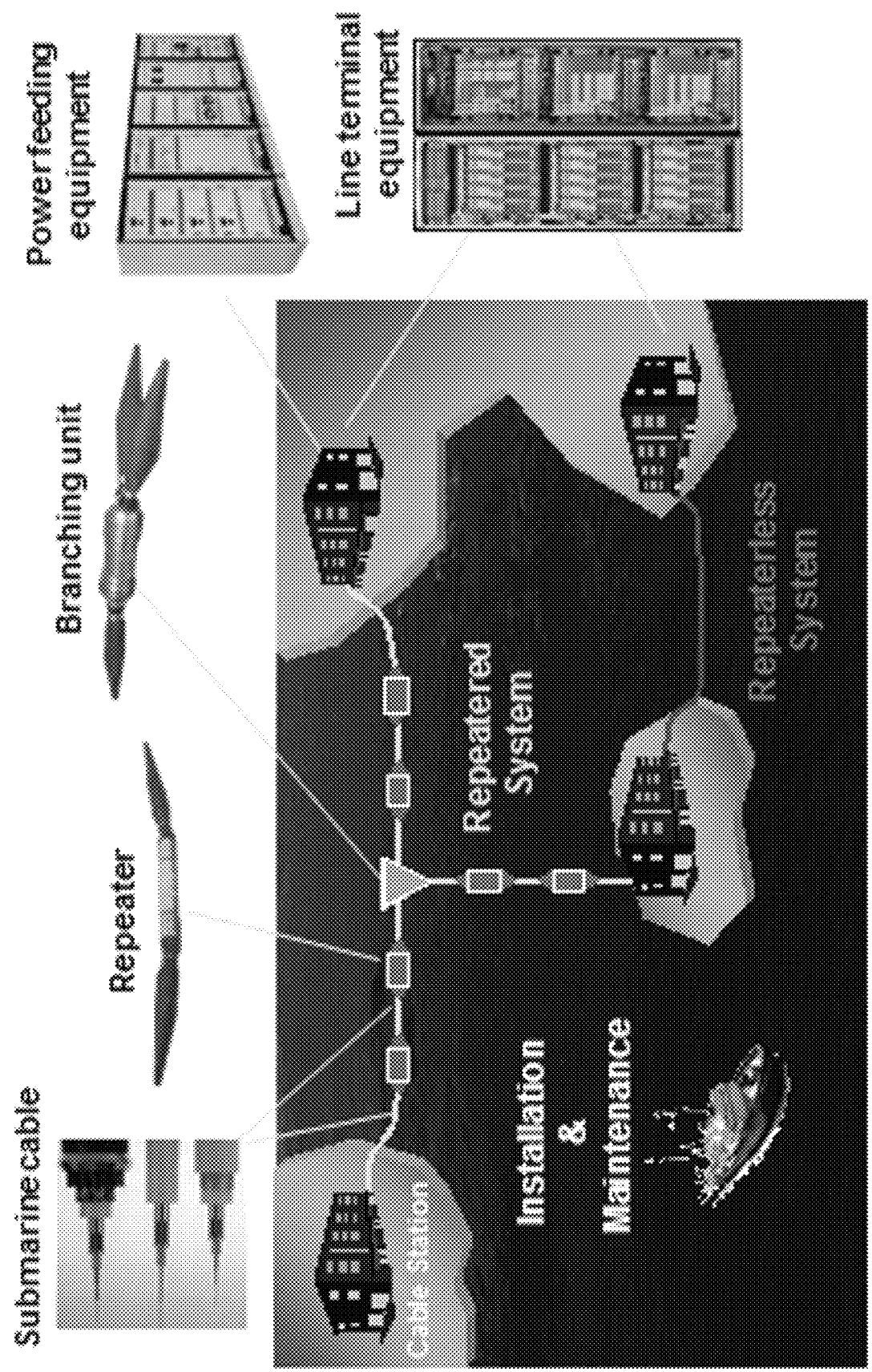
FIG. 1 is a schematic diagram of an illustrative submarine fiber optic telecommunications cable system generally known in the art.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background—and with reference to FIG. 1, which is a schematic diagram of an illustrative submarine fiber optic telecommunications cable system generally known in the art. Referring to that FIG. 1, data to be transmitted originates in one of the cable stations. It is delivered to the other cable stations across the sea via submarine cable.

As those skilled in the art will readily appreciate and as may be observed by inspection of this figure, submarine cables have mainly two parts. 1) a cable span, and 2) repeaters. The cable span can be 40 km to 150 km or longer, but typically in the 50-80 km range. Oftentimes, such cable spans are simply referred in the art as spans.

While a cable span includes several elements as shown, for our purposes herein a main part of our concern regards the optical fiber cables. As is known in the art, optical fibers are very thin strands of glass that can guide light with low attenuation. Optical fibers are very thin, exhibiting only about 250 microns diameter typically.

Generally, optical fibers are made of pure silica glass having a substantially cylindrical shape. Light is guided through a doped center core that is surrounded by a cladding. Typically, the core diameter is of the order of 5-12 micrometers, and the cladding diameter is about 125 micrometers. The glass section is further coated by polymers to protect it which typically brings the overall diameter to 250 micrometers.

In general, fiber optic cables may include a multitude of individual fibers. Each individual fiber can carry additional data. The data capacity is therefore substantially proportional to the number of fibers in the cable.

Since the optical fibers are very thin, in principal the capacity of the cable can be increased dramatically by adding more fibers. However, this is not the case because of power limitations of the fiber optic transmission systems employing the fiber optic cables. Fibers have low attenuation, and as a result of such low attenuation, the optical power can drop to 1% after only 1 span. Therefore, after one span, light traversing the fiber needs to be amplified.

Amplification is done by active amplifier components that generally are housed in another main component of submarine cable systems called repeaters. Inside the repeaters there are typically one amplifier dedicated to each fiber. One of the limitations to the number of fibers that can be supported by the cable system is the number of amplifiers that can be housed by a repeater. The other limitation is the limited electrical power that exists in undersea systems.

As is known, each amplifier uses electricity to amplify the optical power. Such electrical power necessarily must be supplied from each end of an undersea cable system which can be several thousand km long.

Note further in FIG. 1 elements known in the art as branching units (BUs). These branching units are typically located in an undersea location. They include components that allow traffic to be directed in multiple directions. Such direction/redirection is generally achieved by switches that may or may not be wavelength selective. As will be readily understood and appreciated by those skilled in the art, components such as Bus are placed in a housing which protects them from the undersea environment.

We note that there is generally a limitation of a maximum size of the housing that can be installed underwater—which is also related to cost. Since a larger housing generally costs more, it is advantageous to have a switching design that is smaller in size. Another factor that contributes to the size of the housing is the number of fiber pairs in the cable. The larger the number of fiber pairs that needs to have the switching function, the more switching components need to be allocated in the housing, and the larger the housing size needs to be.

As we shall show and describe, our inventive concepts disclosed herein provide for a fiber optic cable transmission system that has improved path diversity in case there is a failure or breakage in part of the link. Our approach achieves this while at the same time retain maximum achievable capacity while keeping overall system cost at a minimum.

Figure 2:
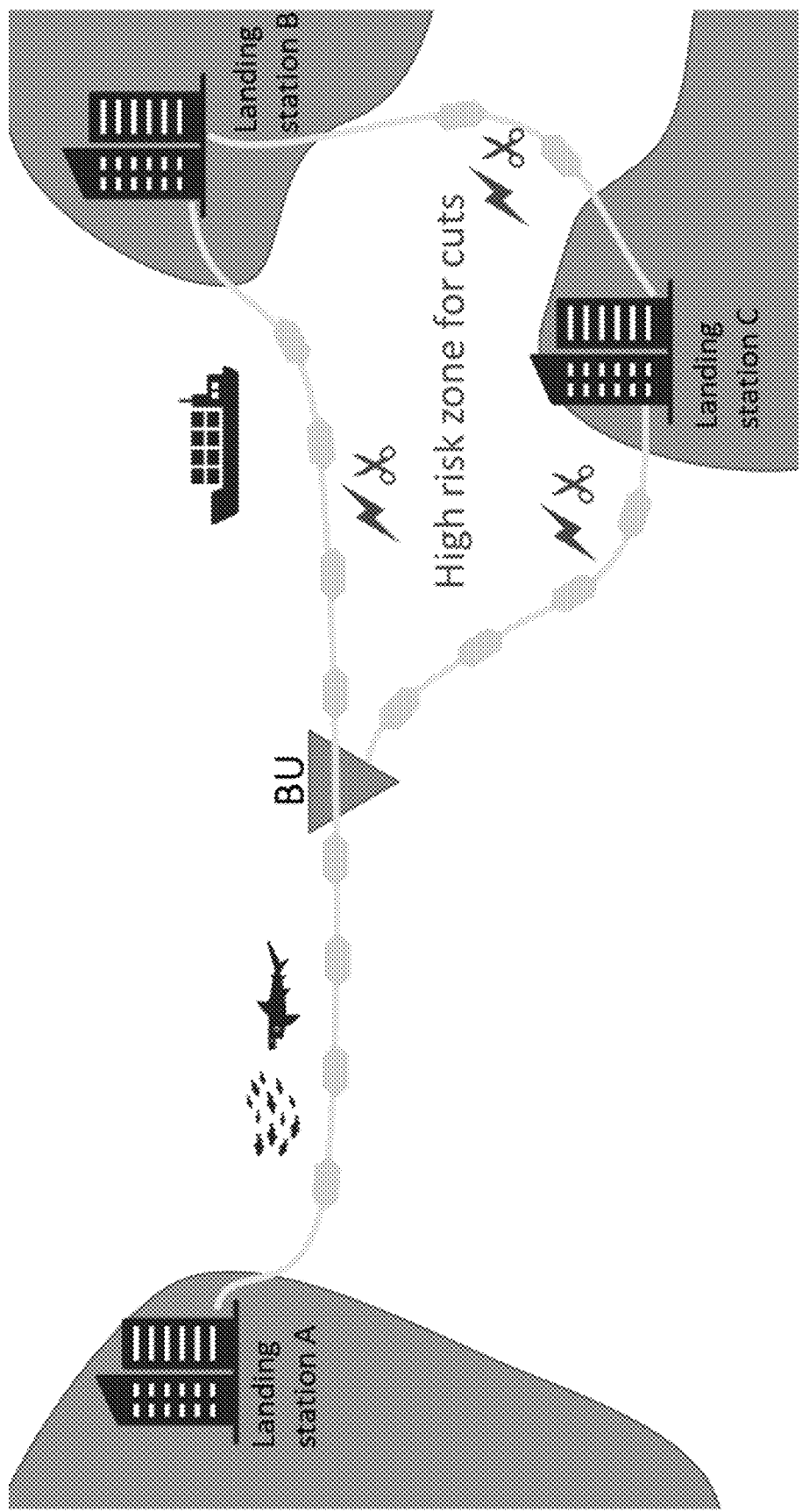
FIG. 2 is a schematic diagram of an illustrative submarine fiber optic telecommunications cable system where path diversity is achieved by a branching unit according to aspects of the present disclosure.

FIG. 2 is a schematic diagram of an illustrative submarine fiber optic telecommunications cable system where path diversity is achieved by a branching unit according to aspects of the present disclosure. As shown in the figure and as will be readily appreciated by those skilled in the art, the figure illustrates an example where path diversity can help to improve connectivity. More particularly, instead of connecting landing station A to only landing station B where most traffic might be needed, it can be split into two paths using a BU and connect A to both B and C, and then B to C.

Of course, in some cases a connection between B and C might already exist through a submarine cable, or terrestrial networks. In case there is breakage in a high risk area such as between BU and B or BU and C or between B and C, one can utilize an alternate route and maintain connectivity during repair. To achieve this functionality, at the BU one should be able to direct the traffic from A to B, or from A to C or from B to C. We call this functionality 3-way switching (3WS)

As previously noted, submarine cables of a submarine system typically have multiple fiber pairs. Each fiber in a pair transport traffic between the same two end points in opposite directions. In some configurations, there are the same number of fiber pairs connected to all three cables connected to the BU. This could be because of cost considerations or limitation of the maximum number of fiber pairs that can be accommodated in cables.

In those situations where there is a breakage between BU and B, all traffic might be connected between A and C. However, in cases where there is no breakage, cable operators might redistribute traffic between AB, AC, and BC depending on traffic load. Those skilled in the art will readily understand and appreciate that it is preferable to have control over how much capacity is allocated between connections, however, a total achievable capacity may depend on the settings.

Figure 3:
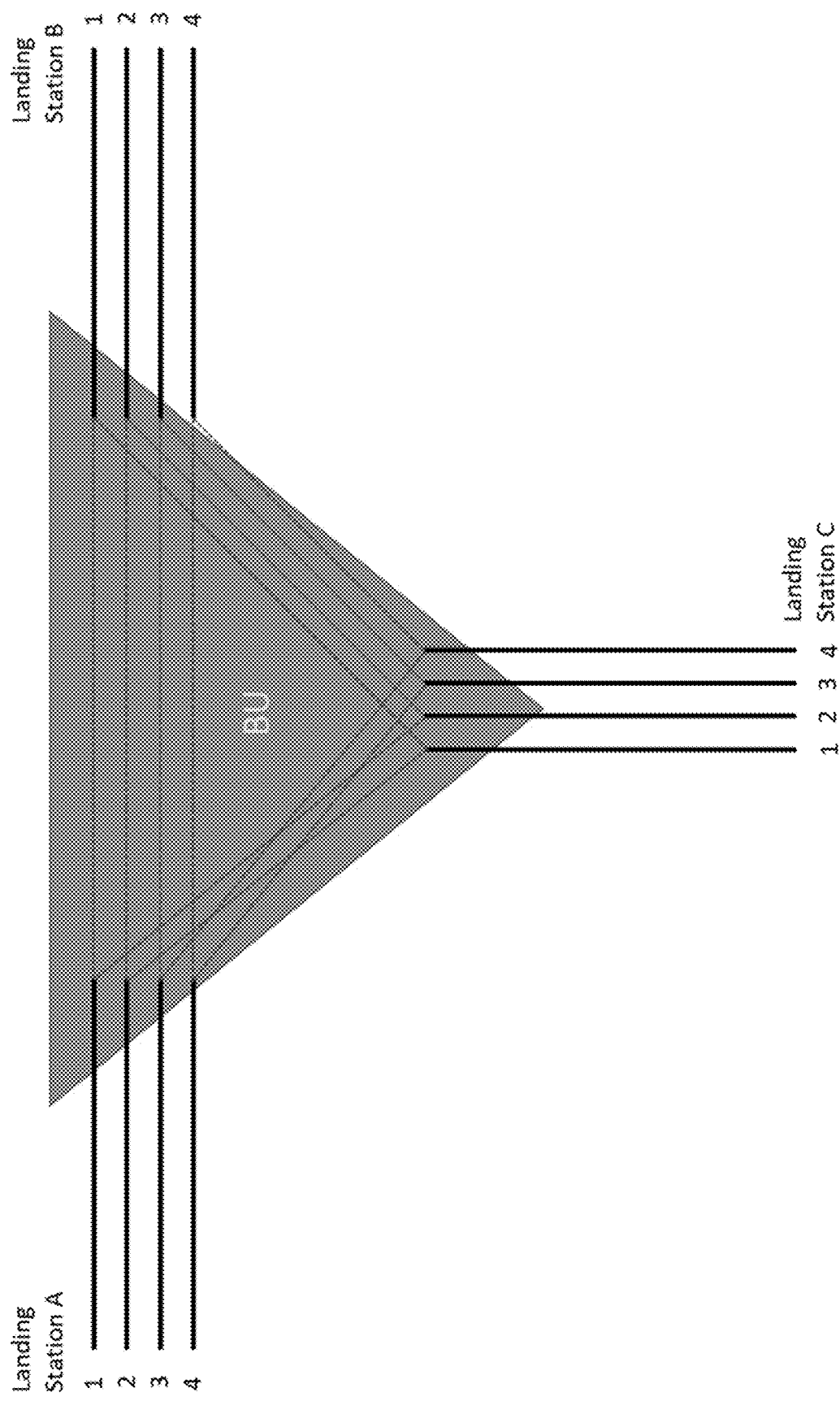
FIG. 3 is a schematic block diagram showing an illustrative branching unit (BU) and connectivity diagram in which each line external to the BU corresponds to a fiber optic pair and each line internal to the BU corresponds to possible connection path(s) according to aspects of the present disclosure.

FIG. 3 is a schematic block diagram showing an illustrative branching unit (BU) and connectivity diagram in which each line external to the BU corresponds to a fiber optic pair and each line internal to the BU corresponds to possible connection path(s) according to aspects of the present disclosure.

With reference to that figure, we note that it shows a connectivity diagram that can achieve this functionality for a 4 fiber pair system. As an example, the traffic in fiber pair 1 from A can be connected to either fiber pair 1 in B or fiber pair 2 in C; the traffic in fiber pair 1 from B can be connected to either fiber pair 1 in A or fiber pair 1 in C; the traffic in fiber pair 1 from C can be connected to either fiber pair 1 in B or fiber pair 2 in A; the traffic in fiber pair 2 from A can be connected to either fiber pair 2 in B or fiber pair 1 in C; the traffic in fiber pair 2 from C can be connected to either fiber pair 1 in A or fiber pair 2 in B. To find the connections for the fiber pair 3 and 4 one can replace 1 with 3 and 2 with 4.

This connection diagram shown schematically in FIG. 3 shows that the analysis of this design can be simplified by noting that switching is confined to a pair of fiber pairs. For instance, in the illustrative example of FIG. 3, switching is confined between fiber pairs 1 and 2, and between 3 and 4 etc. Even if the cable has many fiber pairs, for instance 24 or 36, the switching will happen only between a group of two fiber pairs. We call these fiber pair(s) a switching group.

Figure 4:
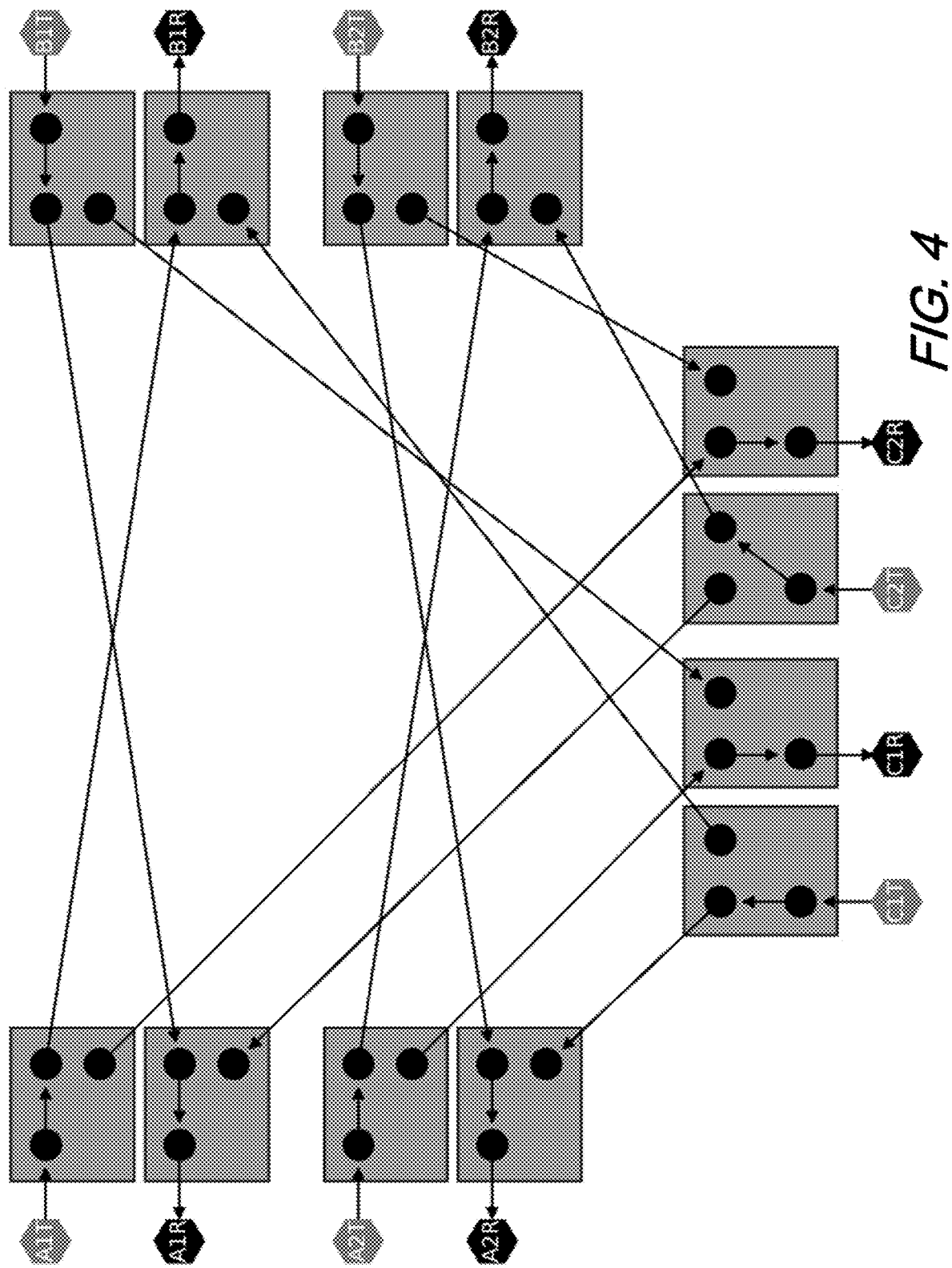
FIG. 4 is a schematic block diagram showing an illustrative topology of a 1×2 switching architecture according to aspects of the present disclosure.

FIG. 4 is a schematic block diagram showing an illustrative topology of a 1×2 switching architecture according to aspects of the present disclosure. As illustrated, such a switch module includes 12, 1×2 switches. These switches can be identical and bi-directional, or they can be unidirectional, in which case the switches connected to a transmitter side will receive signals in the single circle port, and switches connected to a receiver side receive signals from either of the two circles shown. Each switch has two states that is independent of the other switches. Therefore, there are a total of 2^12=4096 different possibilities that the module can be configured. Out of these 4096 states, we are interested in achieving 4 distinct states. These 4 states can be summarized in Table 1.

TABLE 1

| States/Connections | AB | AC | BC |
|---|---|---|---|
| 1 | 1 | 1 | 1 |
| 2 | 2 | 0 | 0 |
| 3 | 0 | 2 | 0 |
| 4 | 0 | 0 | 2 |

Figure 5A:
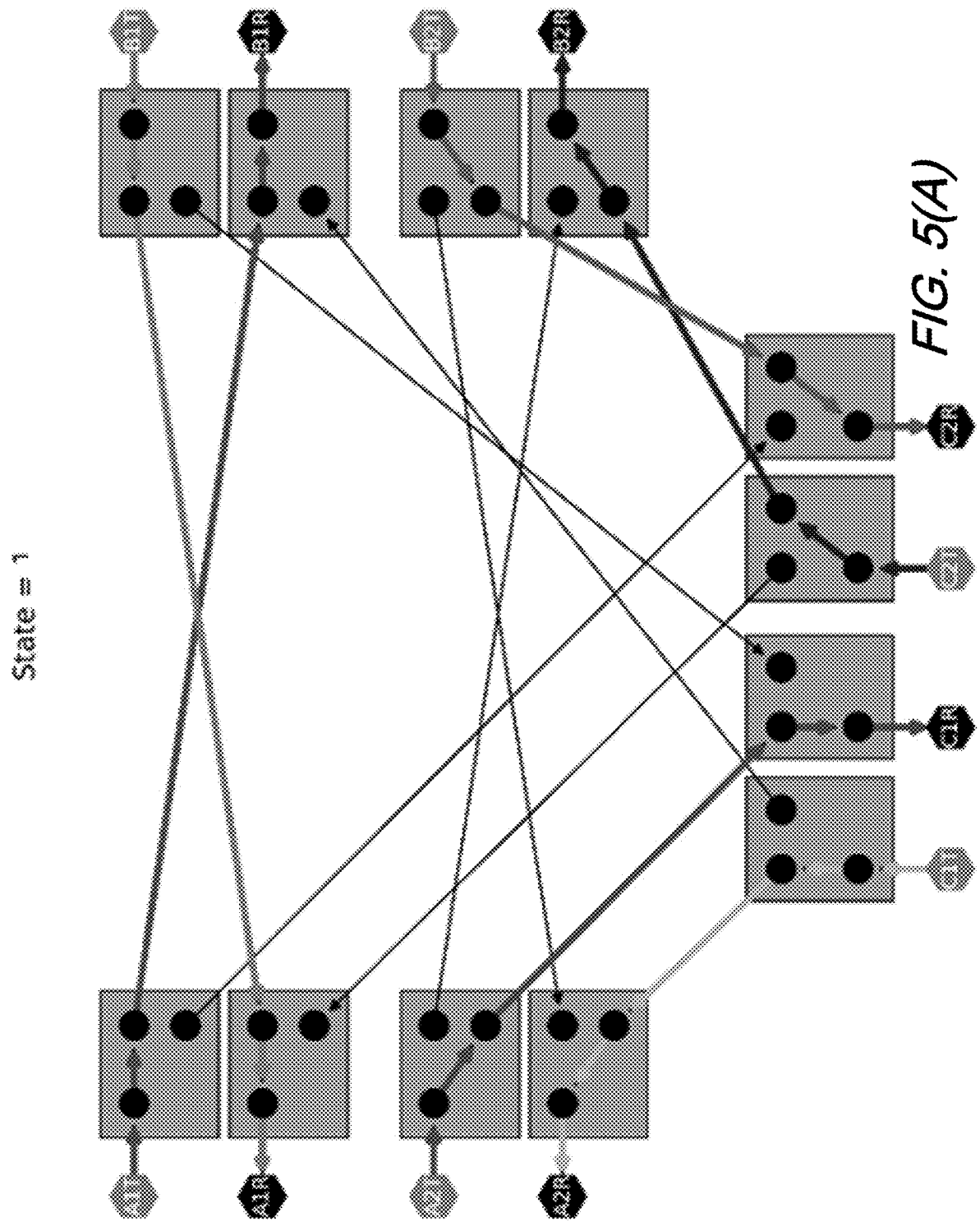
Figure 5C:
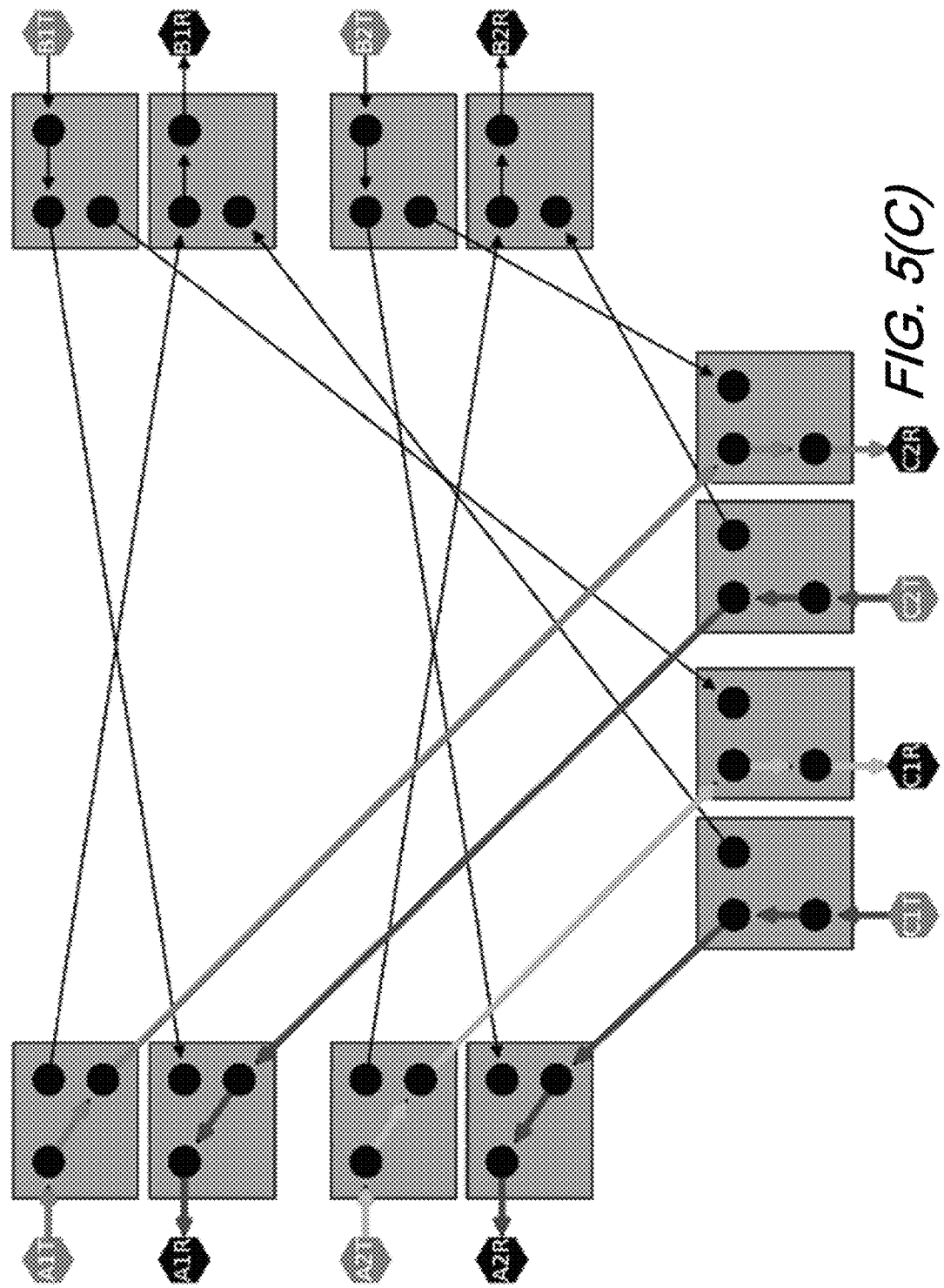
Figure 5D:
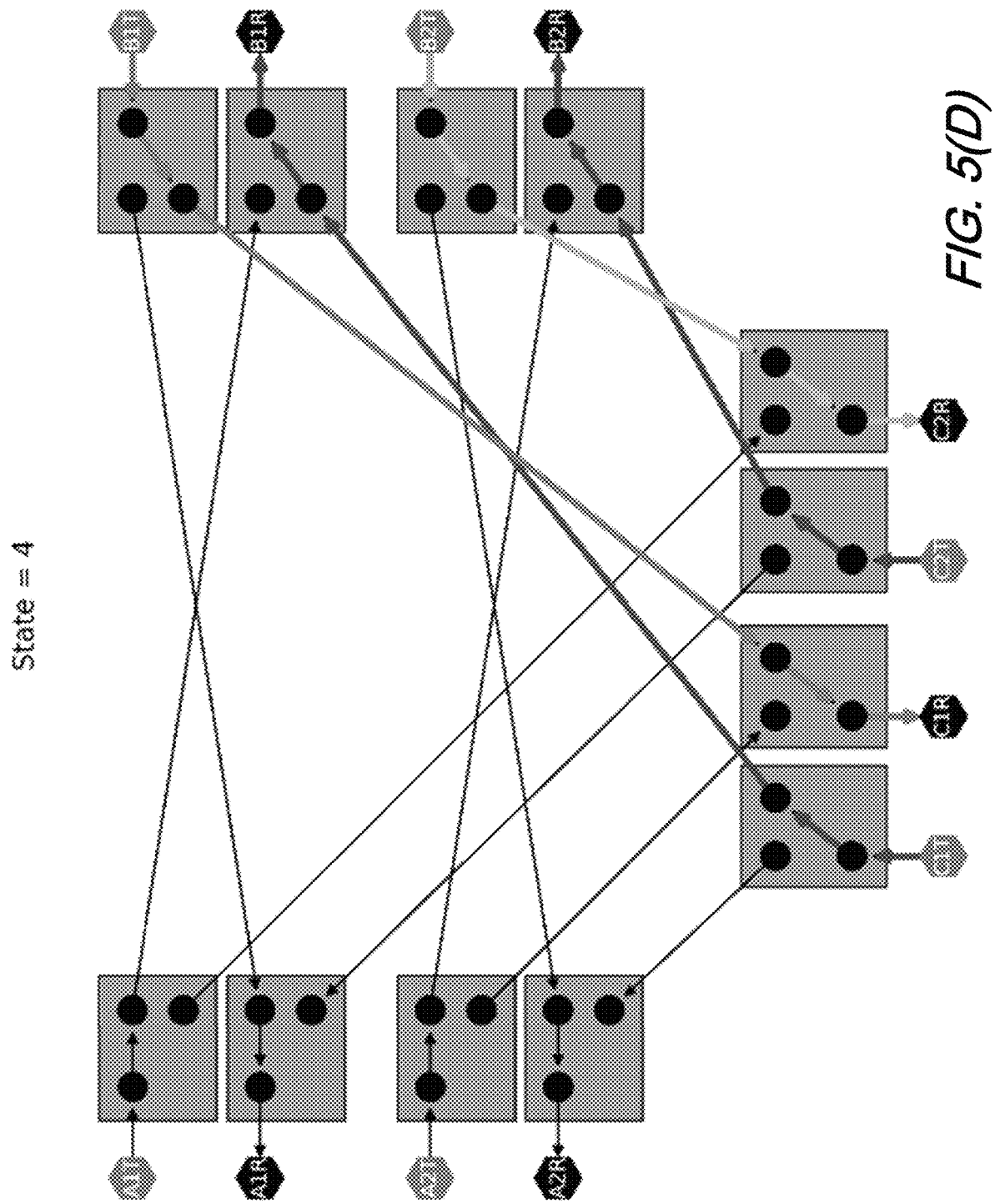

FIG. 5(A), FIG. 5(B), FIG. 5(C), and FIG. 5(D) are schematic diagrams of the 1×2 switch of FIG. 4 showing the 4 possible module states for an architecture that uses 12 1×2 switches wherein traffic carrying connections are shown with arrow end points and thinner lines do not carry traffic in which: FIG. 5(A) shows STATE=1; FIG. 5(B) shows STATE=2; FIG. 5(C) shows STATE=3; and FIG. 5(D) shows STATE=4 according to aspects of the present disclosure.

These figures show how the 12 1×2 switch architecture can achieve all the 4 states outlined in Table 1. The arrows show the direction of the traffic. The black arrows show connections that does not carry traffic in that setting, and the colored thicker arrows show the connections that carry the traffic and their directions. In this architecture, there are indeed two ways to achieve state1.

An alternative setting is shown in FIG. 6 which is a schematic diagram illustrating the 1×2 switch having an alternative setting for STATE=1 according to aspects of the present disclosure. It should be noted that in this architecture traffic in every connection and in all fiber traffic is in only one direction We call an alternative design switch and circulator (SwC). In this design, the number of active components is reduced by half which increases overall module reliability. It also reduces space.

Figure 7:
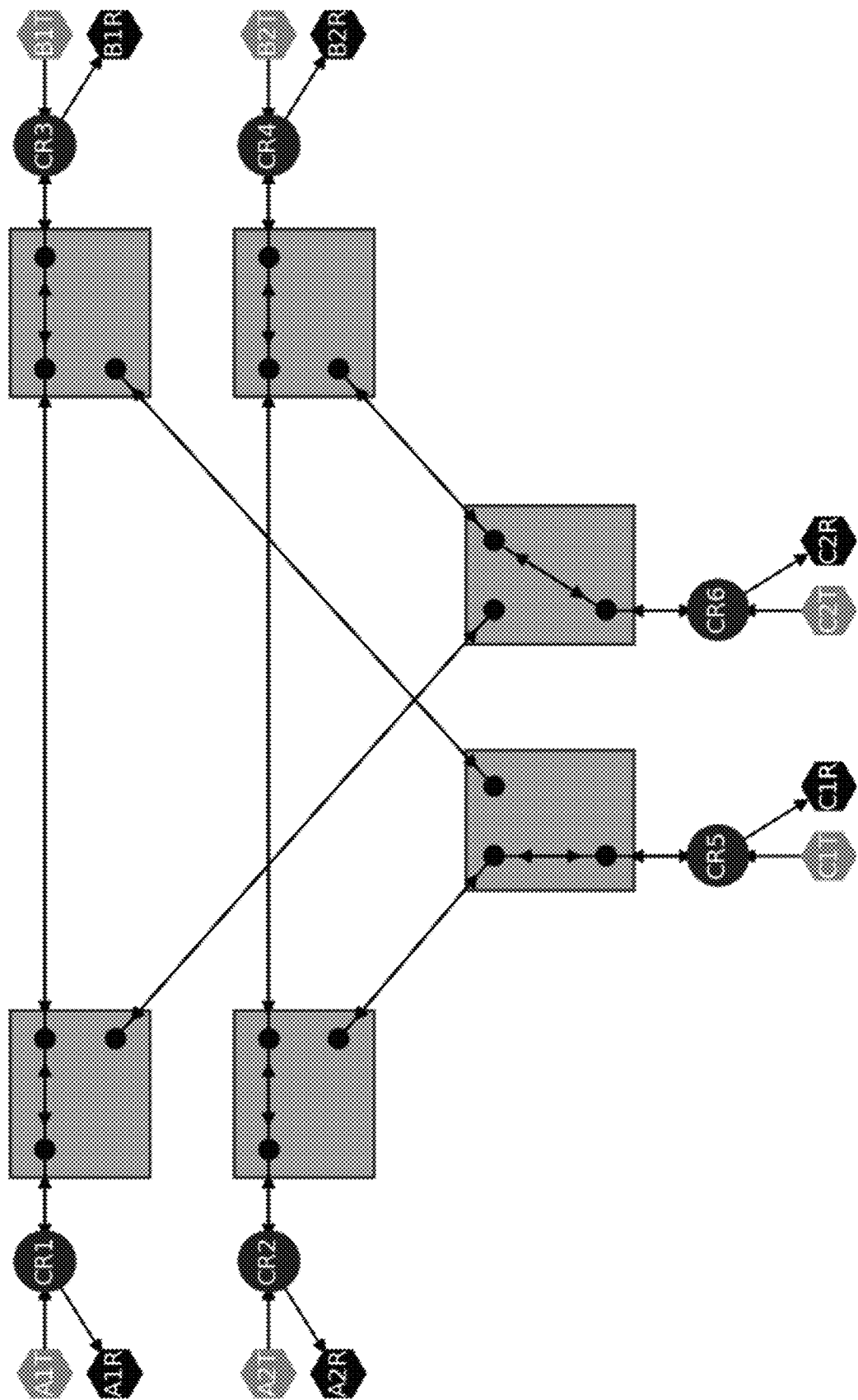
FIG. 7 is a schematic diagram illustrating the 1×2 switch and circulator configuration including 6 1×2 switches and 6 circulators, and arrows show direction of traffic in each connection according to aspects of the present disclosure.

FIG. 7 shows this alternative design which is a schematic diagram illustrating the 1×2 switch and circulator configuration including 6 1×2 switches and 6 circulators, and arrows show direction of traffic in each connection according to aspects of the present disclosure.

Figure 8A:
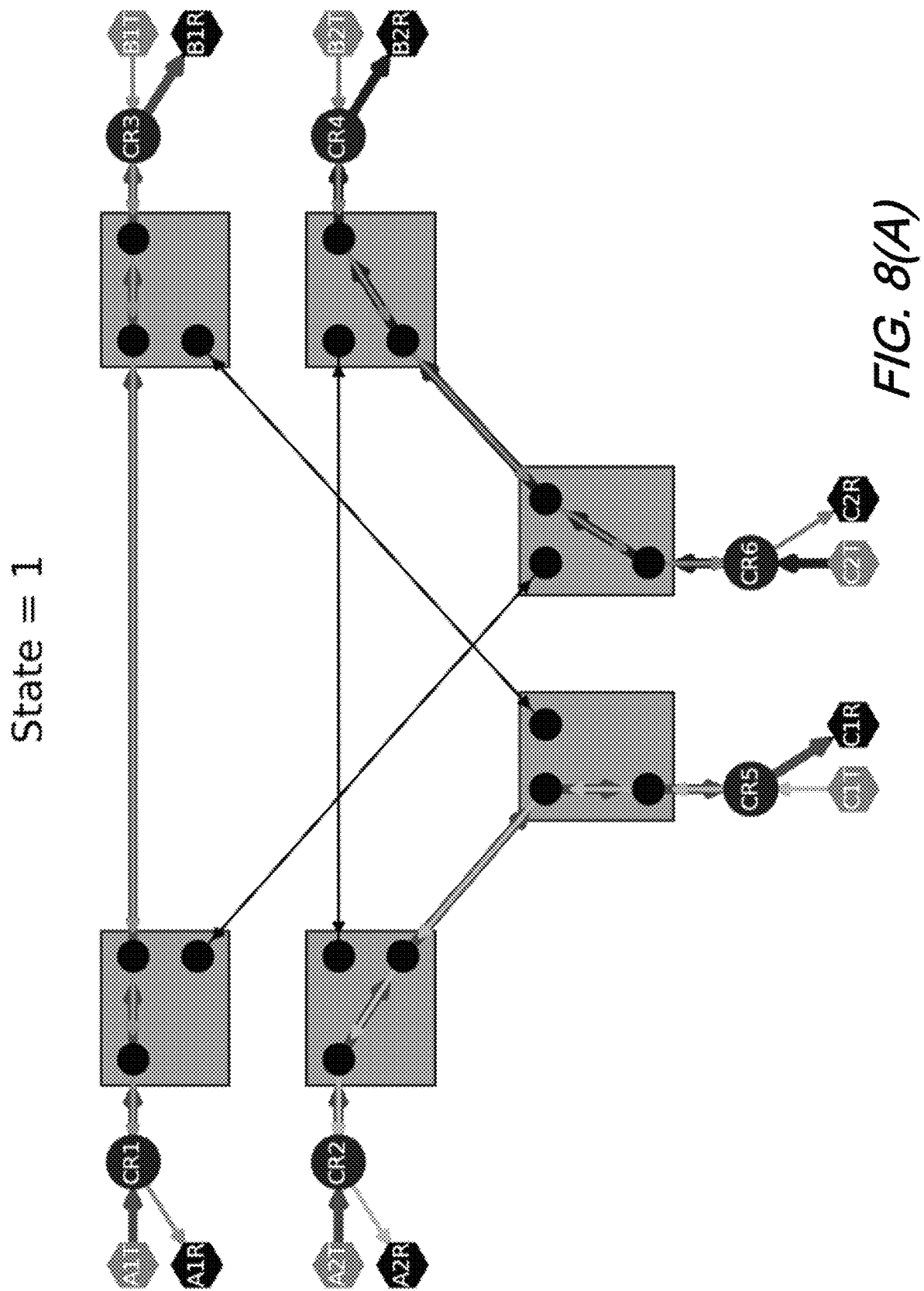
Figure 8B:
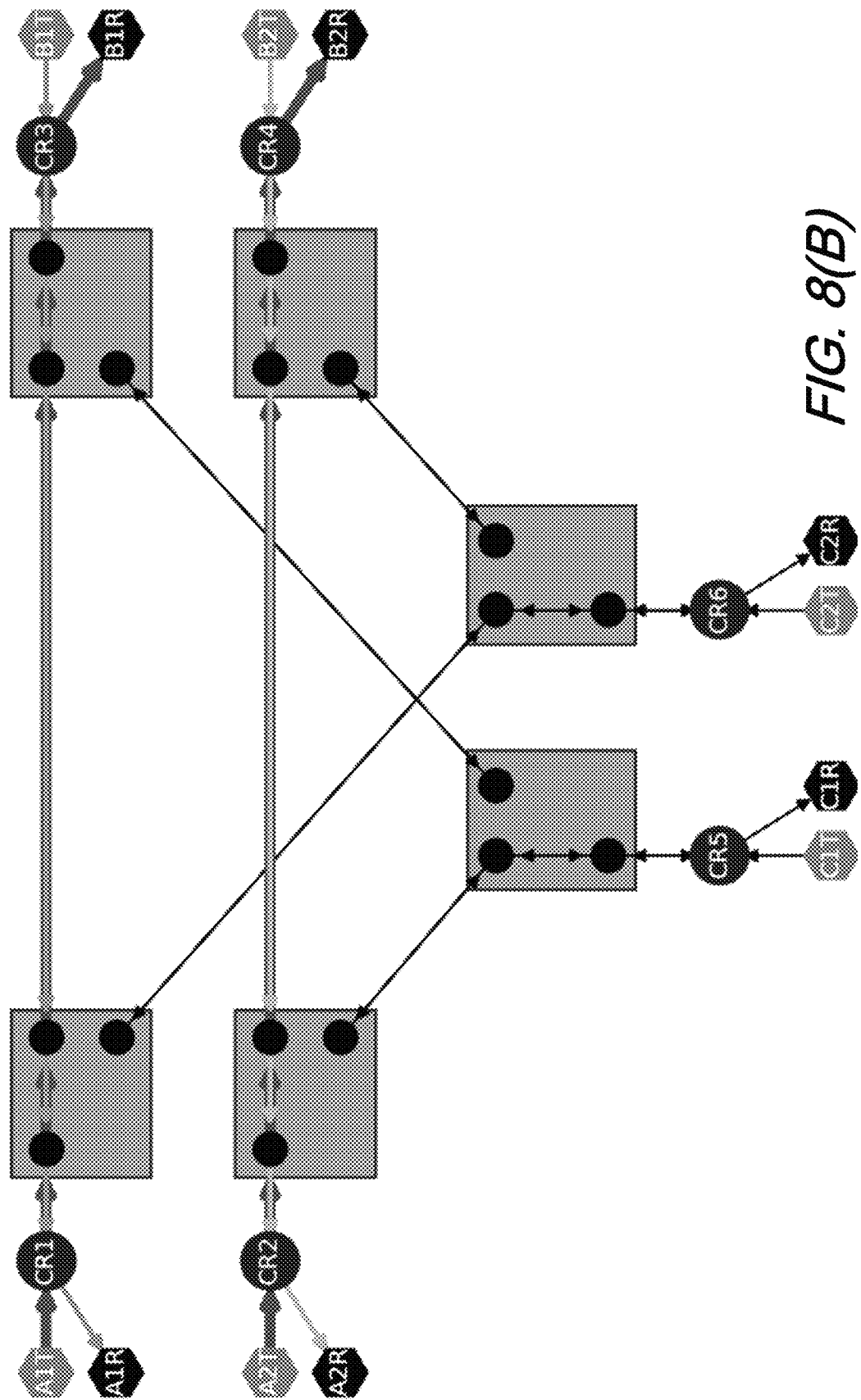
Figure 8C:
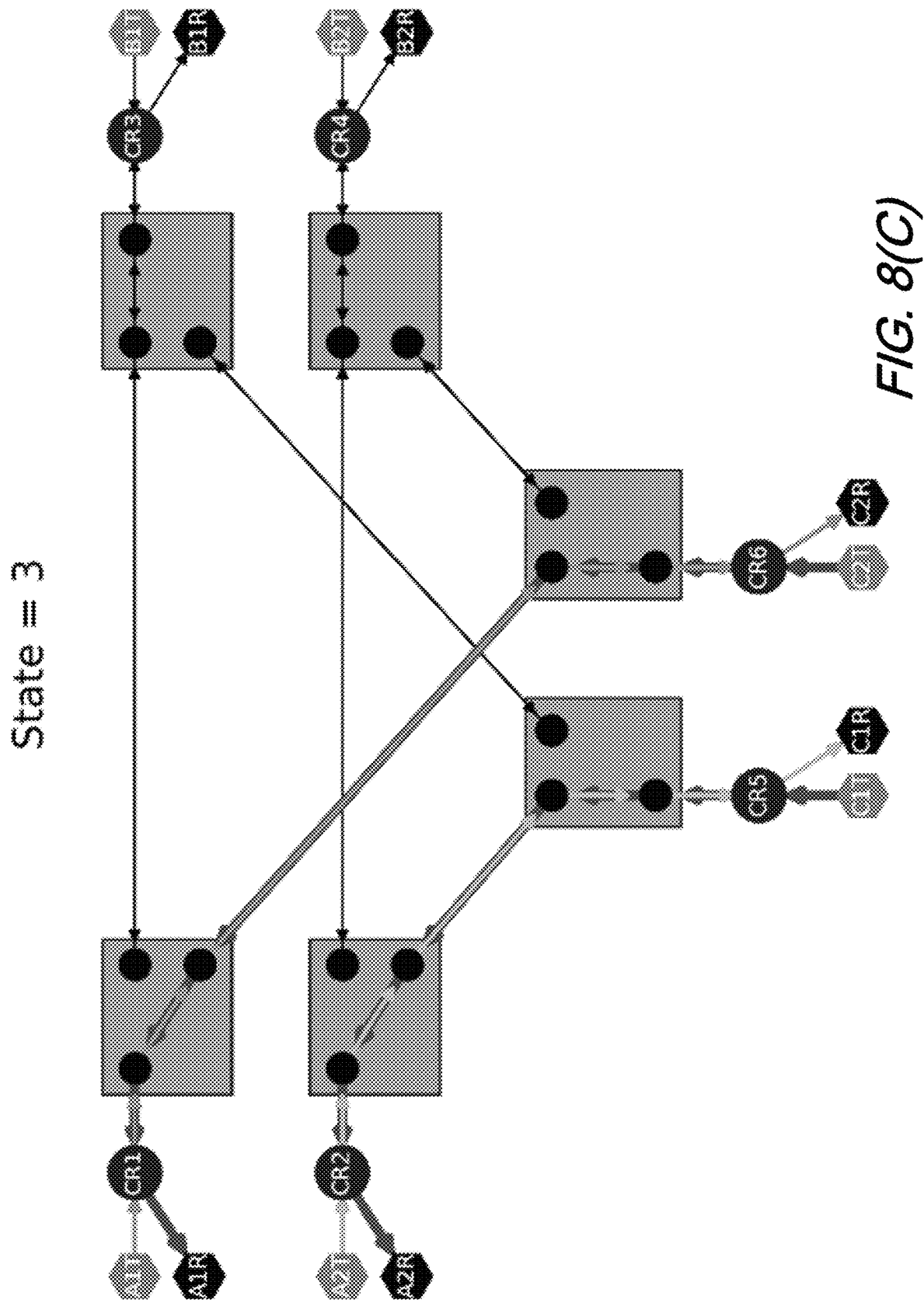
Figure 8D:
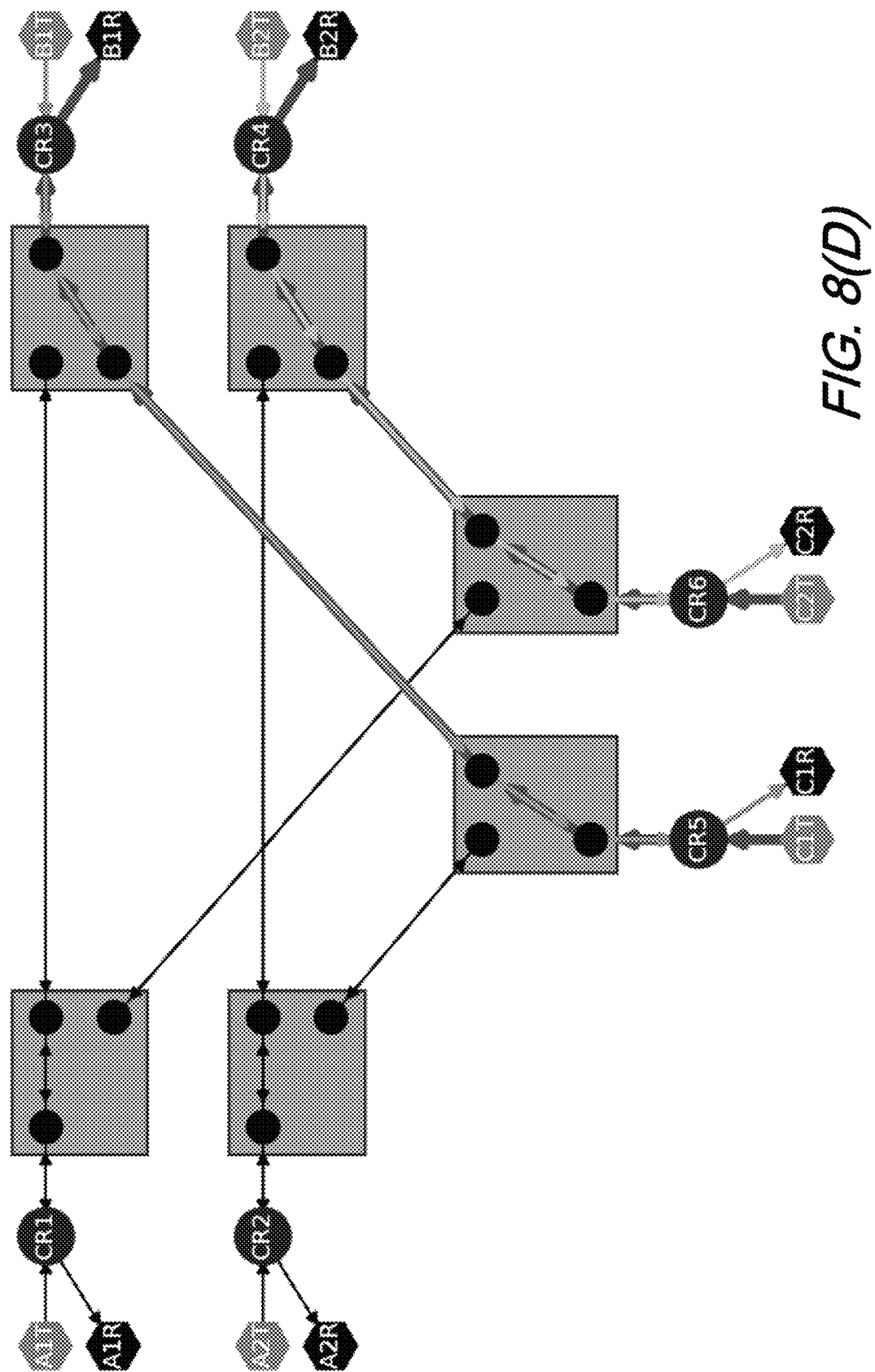

As will be appreciated, SwC can also achieve all the 4 states in Table 1 as it can be seen in FIG. 8(A), FIG. 8(B), FIG. 8(C), and FIG. 8(D) which are schematic diagrams of an architecture including the six (6) 1×2 switches and 6 circulators of FIG. 7 showing the 4 possible module states for the 1×2 switches wherein traffic carrying connections are shown with arrow end points and thinner lines do not carry traffic in which: FIG. 8(A) shows STATE=1; FIG. 8(B) shows STATE=2; FIG. 8(C) shows STATE=3; and FIG. 8(D) shows STATE=4 according to aspects of the present disclosure.

We note that a circulator is a passive component that directs light depending on which port it receives it and in which direction. As an example, if we look at circulator 3 marked as CR3 in FIG. 8(A) in configuration State=1, The light arriving from B1T is directed to the port connected to the switch. The light arriving to the circulator from the switch is directed to the port connected to the fiber marked as B1R.

Comparing the 12 switch design and SwC, we see that it reduced the number of active components (switches are active components) by half. Since passive components are less prone to failure, SwC design is expected to be more reliable. Moreover, circulators are expected to be smaller compared to switches and it is even possible to integrate switches and circulators into the same packaging. As a result, this design is expected to have a smaller footprint.

On the other hand, there are two disadvantages to this design. First, in SwC, the circulators and the switches are placed in series. Therefore, traffic experiences insertion loss from both components (twice, so a total of 4 components). In contrast, in the 12 switch configuration, traffic experiences insertion loss from only two switches. Second, some of the connections carry traffic in both directions simultaneously as shown by the black arrows. That is usually an unwanted characteristic in some systems as it may lead to coherent interference.

Figure 9:
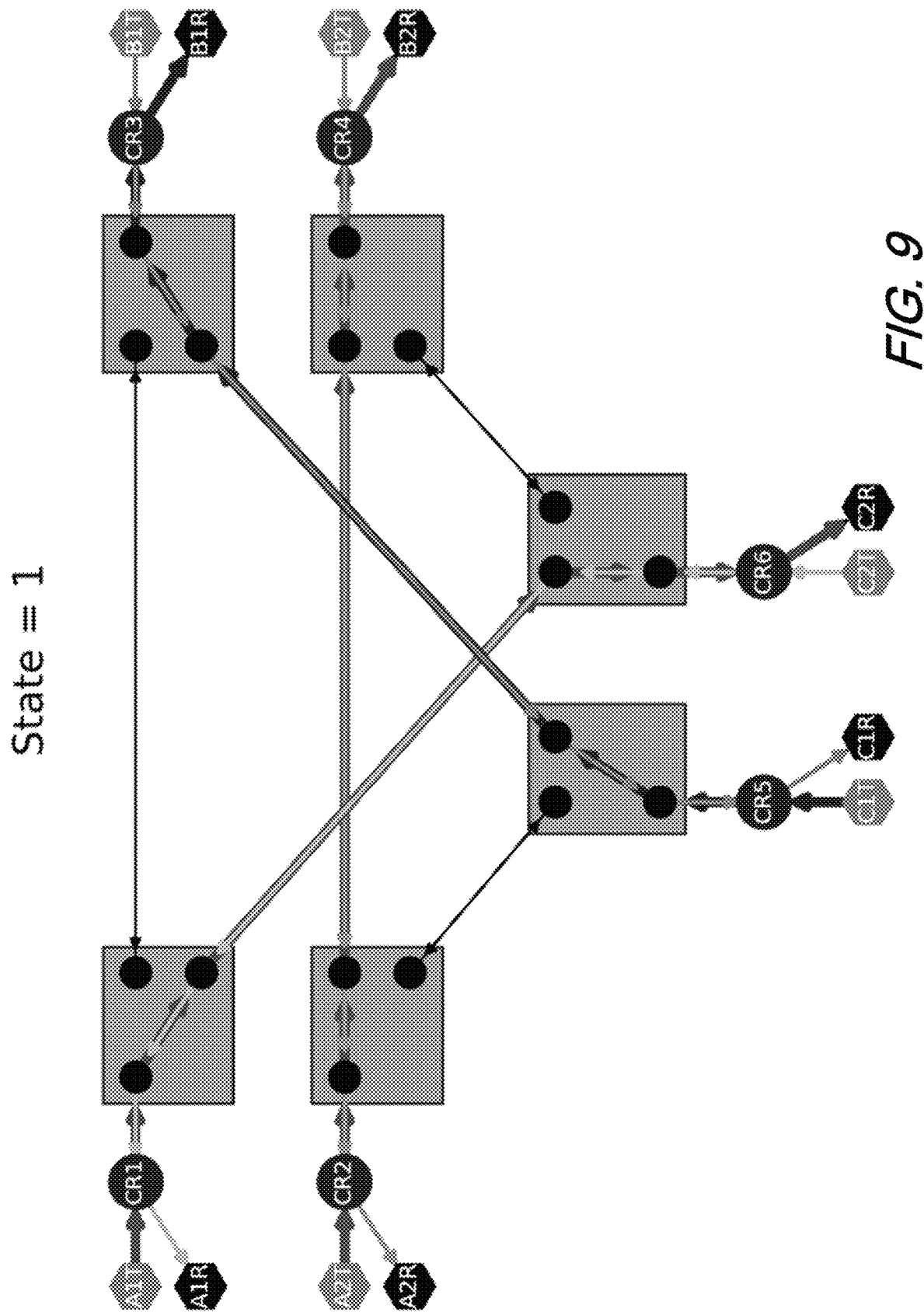
FIG. 9 is a schematic diagram illustrating the 1×2 switch having an alternative setting of the 6 switch, 6 circulator architecture for STATE=1 according to aspects of the present disclosure.

Similar to the case of 12 switch configuration, there are two possible ways to achieve the State1 configuration in the case of SwC. The alternative configuration is shown in FIG. 9 which is a schematic diagram illustrating the 1×2 switch having an alternative setting of the 6 switch, 6 circulator architecture for STATE=1 according to aspects of the present disclosure.

Yet a third design according to aspects of the present disclosure wherein we only need 6 2×2 switches to achieve the 4 states in Table 1 which we will refer to as the 6 switch design (6S). In this design we reduce the number of active components to only 6, and no need for additional circulators, therefore we avoid the extra loss from the circulators, and also achieve fully unidirectional traffic FIG. 10 is a schematic diagram illustrating an alternative 2×2 switching architecture according to aspects of the present disclosure.

In this figure, the topology of the 2×2 switch architecture is disclosed wherein hexagons show fiber pairs connected to switches, labeled as XnY, where X is A, or B, or C, which corresponds to the landing station the are connected to, n is 1 or 2 which is the numbering of the fiber pair, Y is T or R which represents a transmitter or receiver, respectively. For example, MR corresponds to the fiber in the fiber pair 1 that connects the switch to the receiver in the landing station A. C2T is the fiber in the fiber pair 2 that delivers signals from the transmitter in landing station C to the switch. Each rectangle corresponds to a single 2×2 switch. Inside each switch, black circles represent switching nodes.

Figure 10:
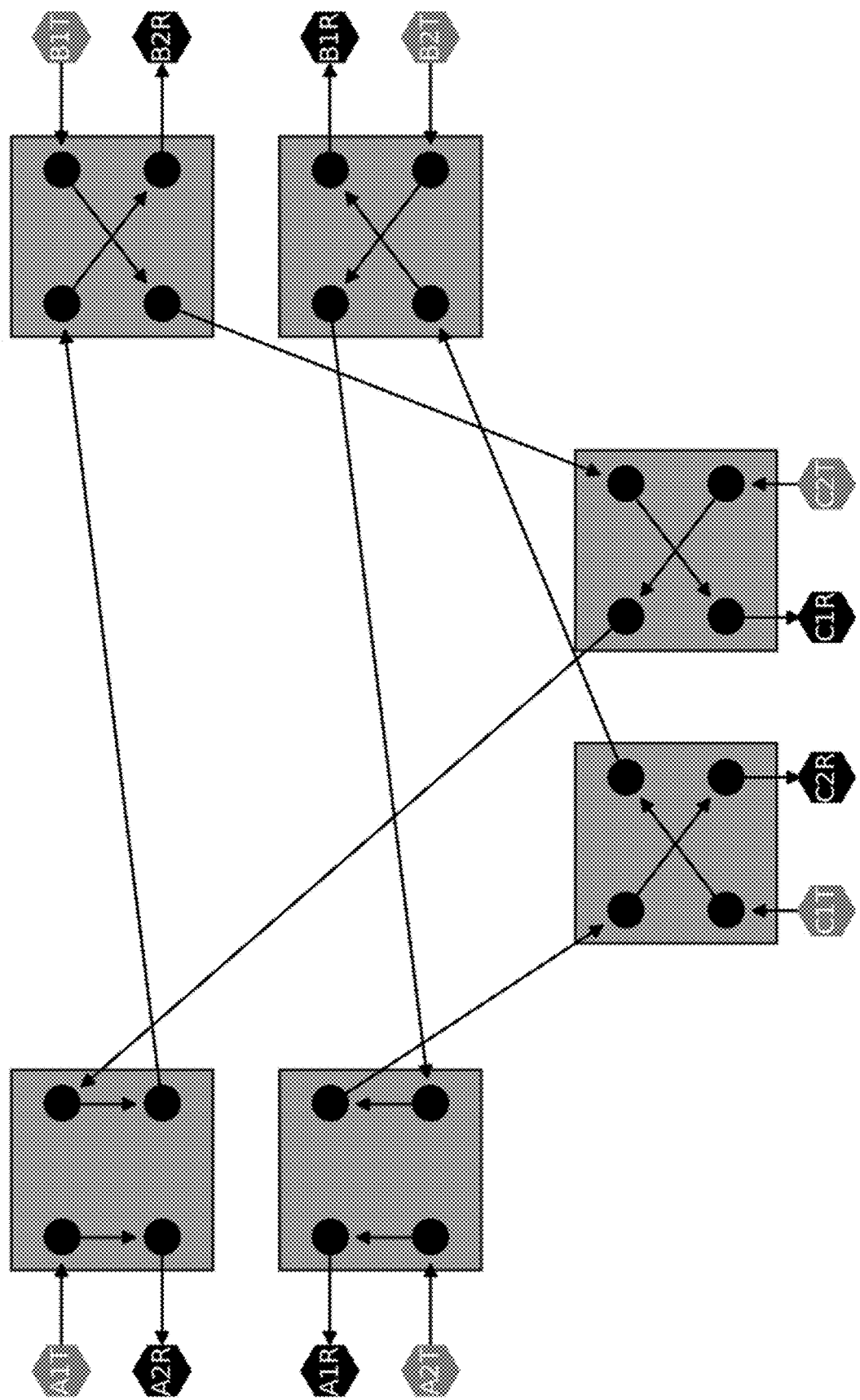
FIG. 10 is a schematic diagram illustrating an alternative 2×2 switching architecture according to aspects of the present disclosure.
Figure 11A:
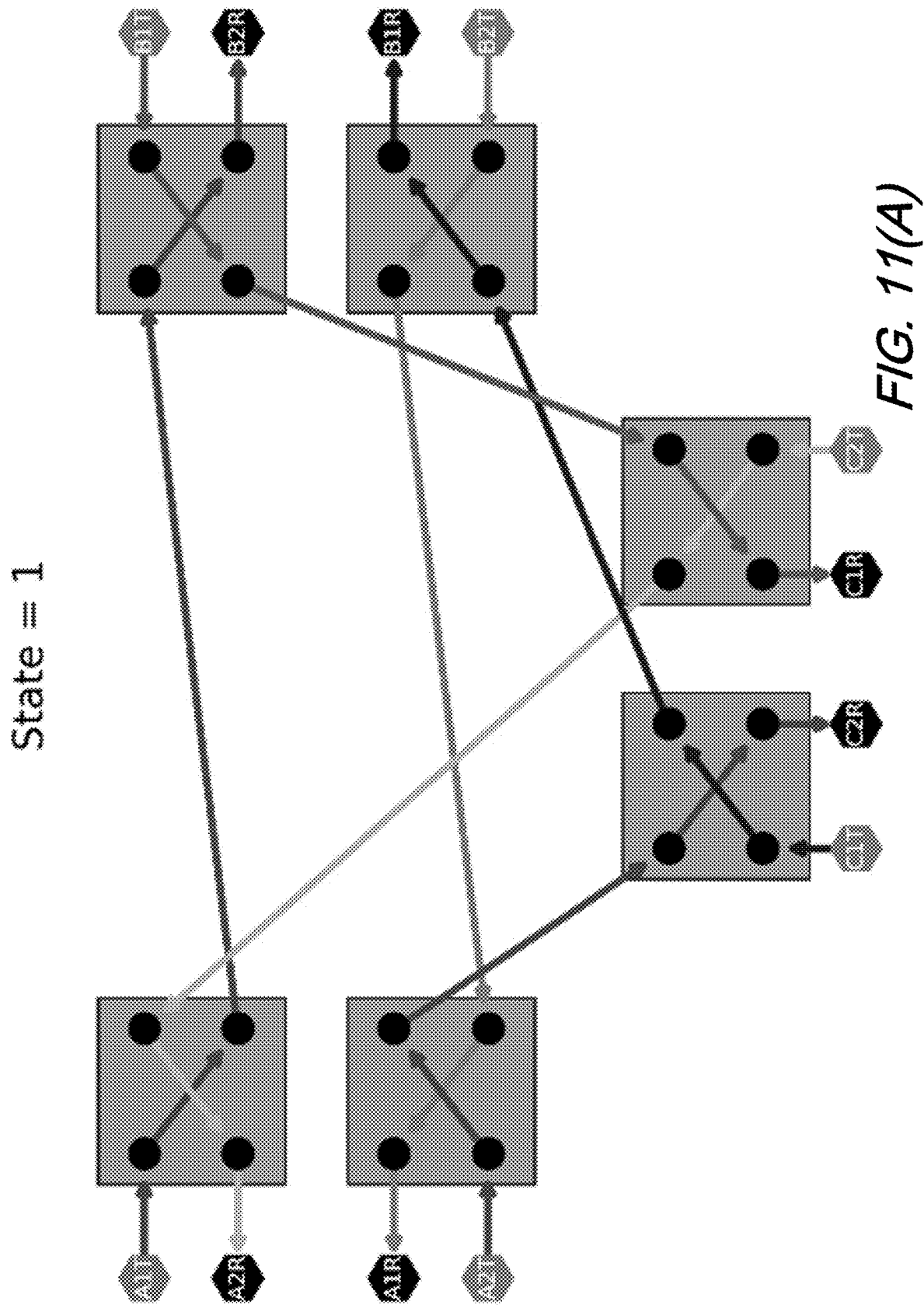
Figure 11B:
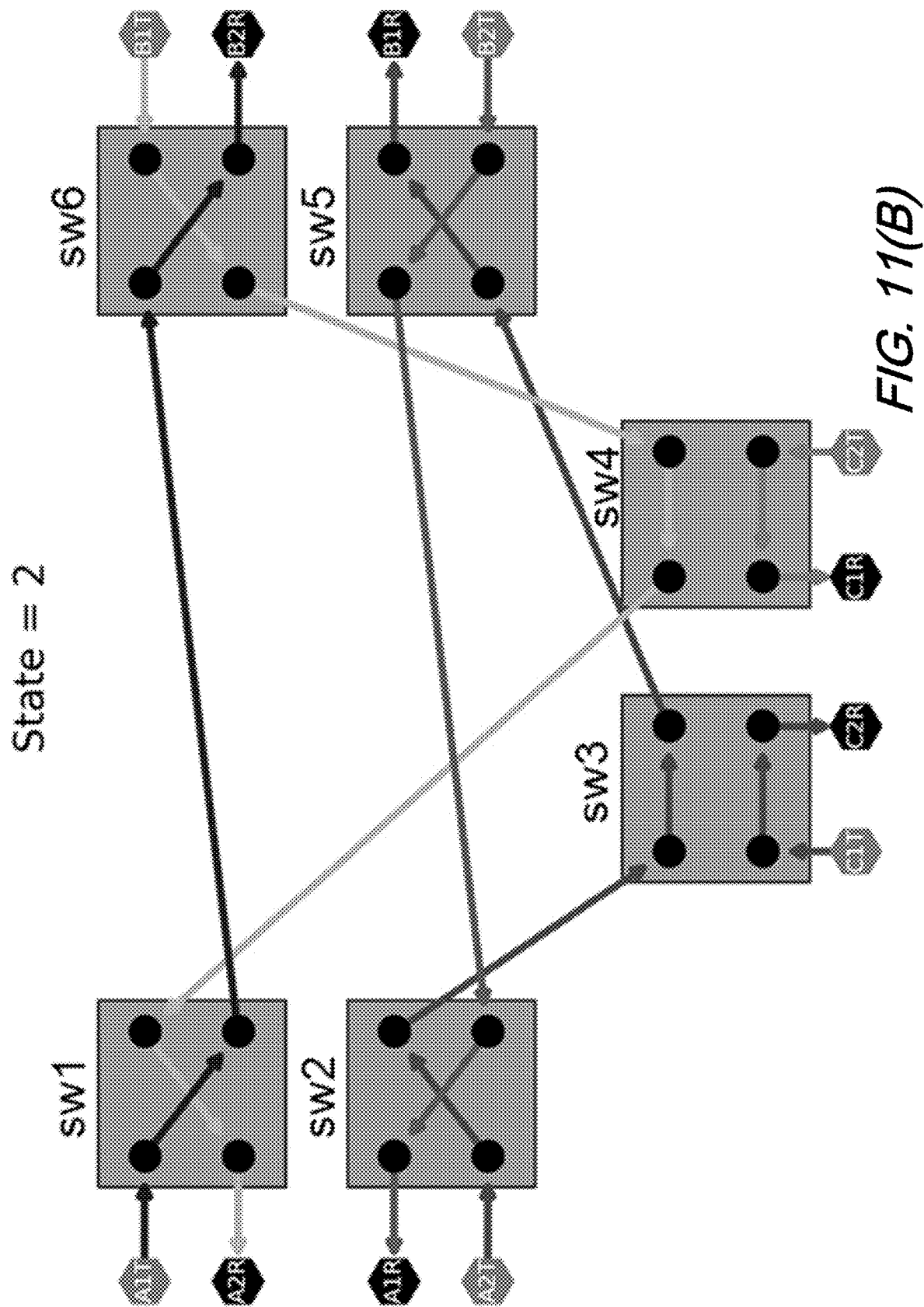
Figure 11C:
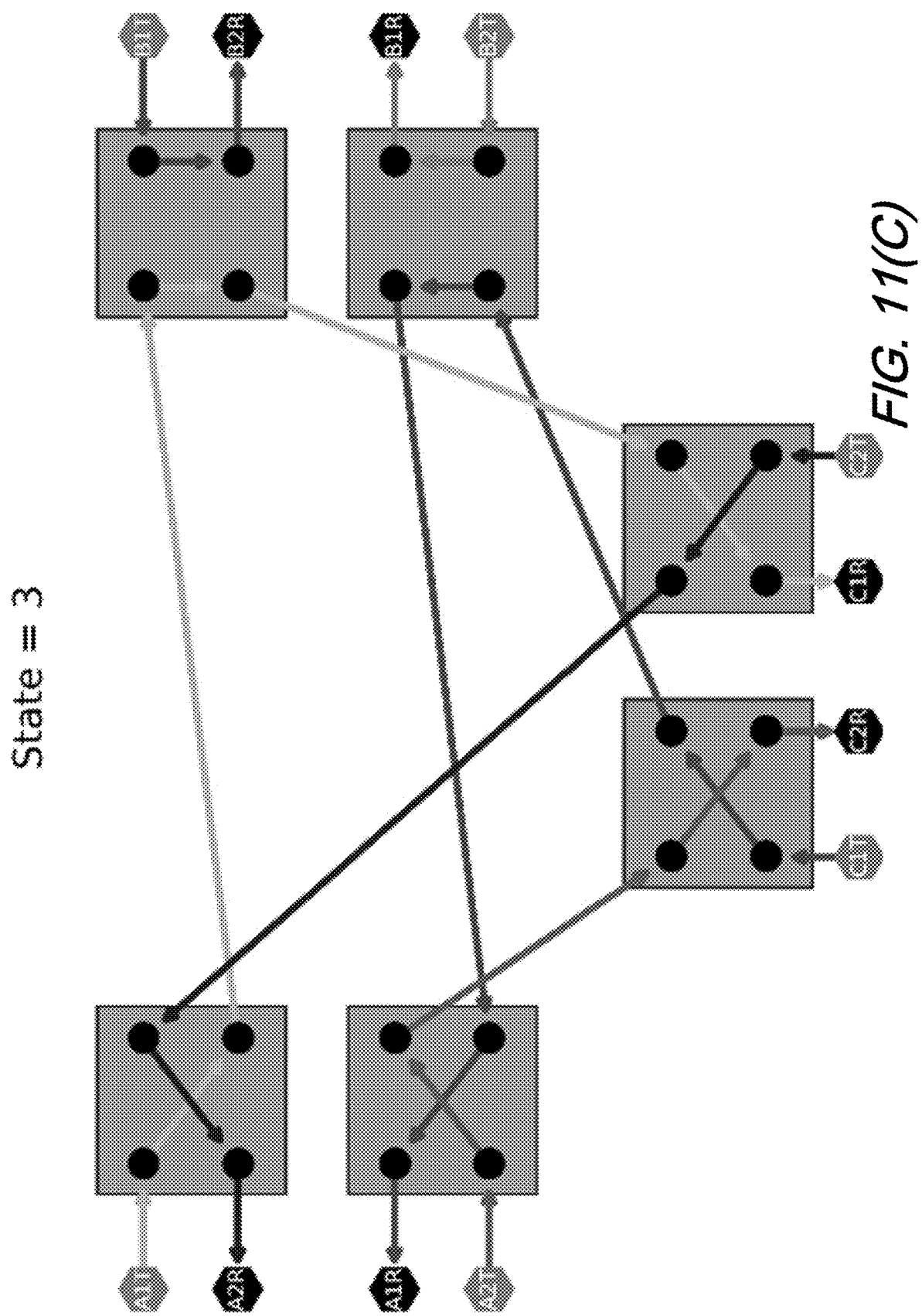
Figure 11D:
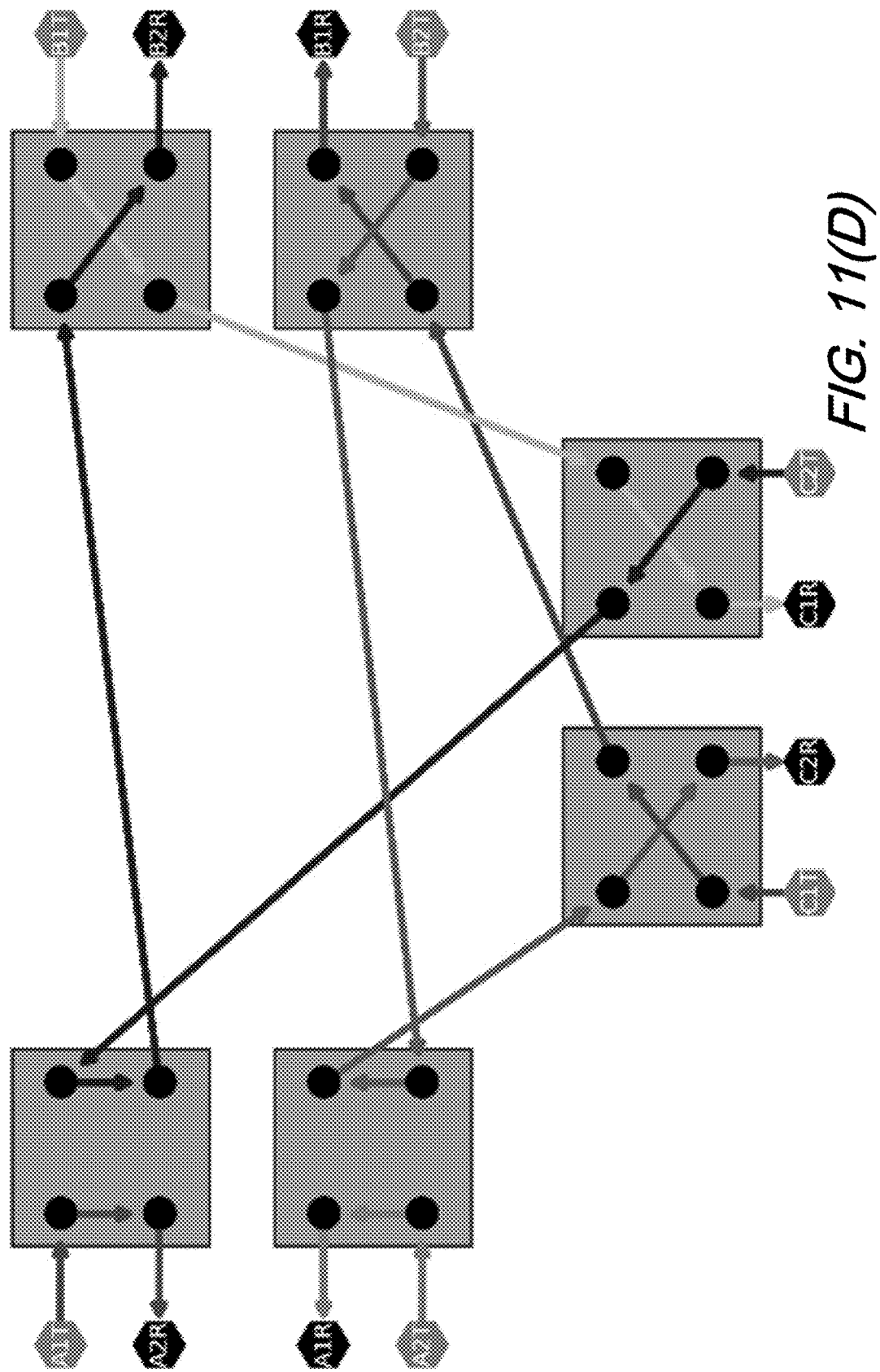

The connections to achieve the 4 states in table 1 are shown in FIG. 11(A), FIG. 11(B), FIG. 11(C), and FIG. 11(D) which are schematic diagrams of an architecture including six (6) 2×2 switches of FIG. 10 showing the 4 possible module states for the 2×2 switches wherein traffic carrying connections are shown with arrow end points and thinner lines do not carry traffic in which: FIG. 11(A) shows STATE=1; FIG. 11(B) shows STATE=2; FIG. 11(C) shows STATE=3; and FIG. 11(D) shows STATE=4 according to aspects of the present disclosure.

We may now explain in more detail how we achieve all the four states in Table 1. To achieve State1, i.e., 1 connection each between A and B, And C, and B and C, lines shows the traffic flow from A1T to B2R (A1T: transmitter connected to fiber pair 1 at landing station A, B2R: receiver connected to fiber pair 2 in landing station B), whereas arrows show the returning traffic from B2T to MR. The arrow shows the traffic flow from A2T to C2R, and the arrow shows the returning traffic from C2T to A2R. The arrow shows the traffic flow from C1T to B1R, and the arrow shows the returning traffic from B1T to C1R.

Similarly, to achieve State2, i.e., 2 connections between A and B with no connections to landing station C. In this case even though no connection is made to the landing station in C, we still make use of switches connected to fiber pairs connected to landing station C. We labeled the switches to describe the State2. Similar to State1 case, as shown by the arrow, traffic goes from A1T through sw1 and sw6 to B2R. In the return path as shown by the arrow B2T is connected to MR through sw6 and sw1. Since there should be two connections established between landing stations A and B, we need a second connection. That connection should connect A2T to B1R, and B2T to MR. But there is no direct connection between sw2 and sw5 which are connected to A2T and B1R, respectively. Therefore, we can connect sw2 and sw5 through sw3 since landing station is not connected. Similarly, a connection between sw1 and sw6 can be patched through sw4 so that B1T can be connected to A2R.

Note that for States 2, 3, and 4, some of the connections have to go through a total of 3 switches instead of 2 switches only as in the case of first design with 12 1×2 switches.

We note that another advantage of using our last design with the 6 2×2 switches is that when a landing station is not connected to any other landing station, traffic is automatically routed back. For instance, for the case of State2 where landing station C is disconnected, the traffic from C1T is routed back to C1R and traffic from C2T is routed back to C2R. We compare this to the first design with 12 1×2 switches where in the case of State2, traffic from C1T and C2T are blocked at the switches, and there is no traffic returning to C1R and C2R. In submarine systems typically all the amplifiers in the links are kept always on, and they are configured to have a certain input power for their designed operation, especially for proper monitoring of the amplifiers and the link. As a result in the case of design 6S, there is always traffic going down the link connected to the receivers at or close to the design power level At this point, while we have presented this disclosure using some specific examples, those skilled in the art will recognize that our teachings are not so limited. Accordingly, this disclosure should only be limited by the scope of the claims attached hereto.

The invention claimed is:

1. An undersea, submarine optical fiber transmission system architecture comprising:
   three landing stations, A, B, and C, each of the landing stations connected by two respective optical fiber pairs to a branching unit;
   the branching unit configured to provide a three-way switching (3WS) function among and between the three landing stations, and
   the branching unit comprising an arrangement of optical switches configured to provide states/connections among and between the three landing stations;
   wherein the branching unit includes 6 1×2 optical switches arranged in groups of 2 switches, each switch of each group optically connected to a circulator which is optically connected to a respective one of the landing stations via a fiber pair, and each group of switches is optically connected to each of the other groups.

* * * * *